US006288534B1

(12) United States Patent
Starkweather et al.

(10) Patent No.: US 6,288,534 B1
(45) Date of Patent: Sep. 11, 2001

(54) NON-CONTACTING THROTTLE VALVE POSITION SENSOR

(75) Inventors: Michael W. Starkweather, Sandy, UT (US); James Patrick McKenna, Edinburgh (GB)

(73) Assignee: CTS Corporation, Elkhart, IN (US)

( * ) Notice: Subject to any disclaimer, the term of this patent is extended or adjusted under 35 U.S.C. 154(b) by 0 days.

(21) Appl. No.: 09/248,025

(22) Filed: Feb. 10, 1999

(51) Int. Cl.[7] .................................. G01B 7/30; F02P 7/07

(52) U.S. Cl. .................................. 324/207.2; 324/207.22; 324/207.25; 123/405.52; 123/617

(58) Field of Search ..................................... 324/173, 174, 324/207.2, 207.21, 207.22, 207.25; 123/146.5 A, 406.52, 617

(56) References Cited

U.S. PATENT DOCUMENTS

| | | | |
|---|---|---|---|
| 3,112,464 | 11/1963 | Ratajski et al. . | |
| 3,742,243 | 6/1973 | Gamble | 324/174 X |
| 4,166,977 * | 9/1979 | Glauert et al. | 324/174 X |
| 4,316,144 * | 2/1982 | Levijoki | 324/174 |
| 4,392,375 | 7/1983 | Eguchi et al. | 324/207.21 X |
| 4,399,407 | 8/1983 | Kling et al. . | |
| 4,570,118 | 2/1986 | Tomczak et al. | 324/207.2 |
| 4,703,261 | 10/1987 | Berchtold | 324/207.2 |
| 4,777,464 | 10/1988 | Takabatashi et al. . | |
| 5,055,781 | 10/1991 | Sakakibara et al. | 324/207.21 |
| 5,089,798 | 2/1992 | Miyata . | |
| 5,164,668 | 11/1992 | Alfors | 324/207.2 |
| 5,191,284 | 3/1993 | Moretti et al. | 324/207.2 X |
| 5,270,645 | 12/1993 | Wheeler et al. | 324/207.25 X |
| 5,565,834 | 10/1996 | Hanley et al. . | |
| 5,672,818 * | 9/1997 | Schaefer et al. | 73/118.2 |
| 5,712,561 | 1/1998 | McCurley et al. | 324/207.2 |
| 5,754,085 | 5/1998 | Danby et al. . | |
| 5,757,179 | 5/1998 | McCurley et al. | 324/207.2 |
| 5,798,639 | 8/1998 | McCurley et al. | 324/207.2 |

FOREIGN PATENT DOCUMENTS

| | | |
|---|---|---|
| 893986 | 5/1962 | (GB) . |
| 990993 | 5/1965 | (GB) . |
| 2 229 006 A | 12/1990 | (GB) . |
| 3074812 | 3/1991 | (JP) . |

* cited by examiner

*Primary Examiner*—Gerard R. Strecker
(74) *Attorney, Agent, or Firm*—Spencer Warnick; Mark P. Bourgeois; Mark W. Borgman

(57) ABSTRACT

A throttle valve position sensor in which a non-contacting, magnetic field sensor is coupled to or integral with a gear wheel of a geared throttle valve control. The sensor provides a more durable sensor. Sensor circuitry can be provided on the lid of the control, along with control motor electrical connections, so that the sensor and control motor can be connected by simple joining in a single operation. The throttle control valve is intended for internal combustion engines for motor vehicles.

19 Claims, 6 Drawing Sheets

NON-CONTACTING THROTTLE VALVE POSITION SENSOR

BACKGROUND OF THE INVENTION

This application is related to U.S. Pat. No. 5,672,818 issued to Schaefer et al. on Sep. 30, 1997.

1. Technical Field

The present invention relates generally to throttle control valves and, more particularly, to throttle valve position sensors for a geared throttle control valve.

2. Related Art

Heretofore, throttle valve adjusting units with control motors with geared transmissions have been known. One such device is exhibited in U.S. Pat. No. 5,672,818 to Schaefer et al., incorporated herein by reference. This device provides the advantage that the lid includes motor electronic connection components thereon that would previously have required soldering between the lid and motor. Further, this device provides the advantage of having the potentiometer path mounted on the lid. As a result, the connection of the sensor and motor can be made simply by mounting the lid in a single operation. Further, the device can be easily produced by mass production. However, a disadvantage of this type device is that the sensor requires contact between components thereof, which deteriorate over time and, hence, can foul the geared transmission when breakage occurs.

While non-contacting position sensors, such as those of U.S. Pat. Nos. 5,798,639, 5,757,179 and 5,712,561, all to McCurley et al. and all incorporated herein by reference, have also been used, none of these devices have been applied in a geared transmission setting.

In view of the foregoing, there is a need for a non-contacting throttle valve position sensor for use with a throttle control valve having a throttle valve shaft controlled by a control motor through a geared transmission.

SUMMARY OF THE INVENTION

A first general aspect of the present invention is a throttle valve position sensor for use with a throttle control valve having a throttle valve shaft rotatably supported in a throttle housing and positionable by a control motor through a geared transmission. The throttle valve position sensor comprises a gear, fixed to the throttle valve shaft, for positioning the throttle valve shaft. There is also a magnetized portion positioned parallel to the gear and coupled to the gear to rotate therewith. Additionally, there is a flux density sensor for sensing a flux density indicative of a position of the magnetized portion and determining a position of the throttle valve shaft.

In a second general aspect of the invention, there is provided a throttle valve position sensor for use with a throttle control valve having a throttle valve shaft rotatably supported in a throttle housing and positionable by a control motor through a geared transmission. Specifically, the throttle valve position sensor comprises means for creating a variable magnetic field. There is also means for coupling the variable magnetic field means to a gear of the geared transmission such that the variable magnetic field moves with the gear, and a magnetic field sensor for sensing changes in position of the gear based on the variable magnetic field.

In a third general aspect of the invention, there is provided a throttle control device comprising a throttle valve secured to a throttle valve shaft that is rotatably supported in a throttle valve housing. There is also a control motor, supported by the throttle valve housing, including a drive gear operatively coupled to the throttle valve shaft for adjusting the rotational position thereof. Also, there is a magnetized portion coupled to the drive gear and a flux density sensor for detecting the rotational position of the magnetized portion. The sensor includes circuitry. A lid for the device is coupled to the throttle valve housing and the circuitry is mounted on the lid. A coupling part is formed onto the lid and includes electrical connections to the control motor and circuitry.

The throttle control valve device and throttle valve position sensor, according to the invention, offers advantages over the prior art. Specifically, there is a non-contacting sensor with a geared transmission that maintains the advantages of the above-identified related art device U.S. Pat. No. 5,672,818. The replacement of the potentiometer with a non-contacting throttle valve position sensor advantageously prevents fouling of the geared transmission or sensor through breakage of the wipers or gears and increases longevity of the device while maintaining the advantages.

The foregoing and other features and advantages of the invention will be apparent from the following more particular description of preferred embodiments of the invention.

BRIEF DESCRIPTION OF THE DRAWINGS

The preferred embodiments of this invention will be described in detail, with reference to the following figures, wherein like designations denote like elements, and wherein.

DESCRIPTION OF THE PREFERRED EMBODIMENTS

Although certain preferred embodiments of the present invention will be shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., and are disclosed simply as an example of the preferred embodiment.

The throttle control valve can be used in any internal combustion engine in which engine performance is to be influenced with the aid of a throttle valve adjustable by means of a control motor.

Figure 1:
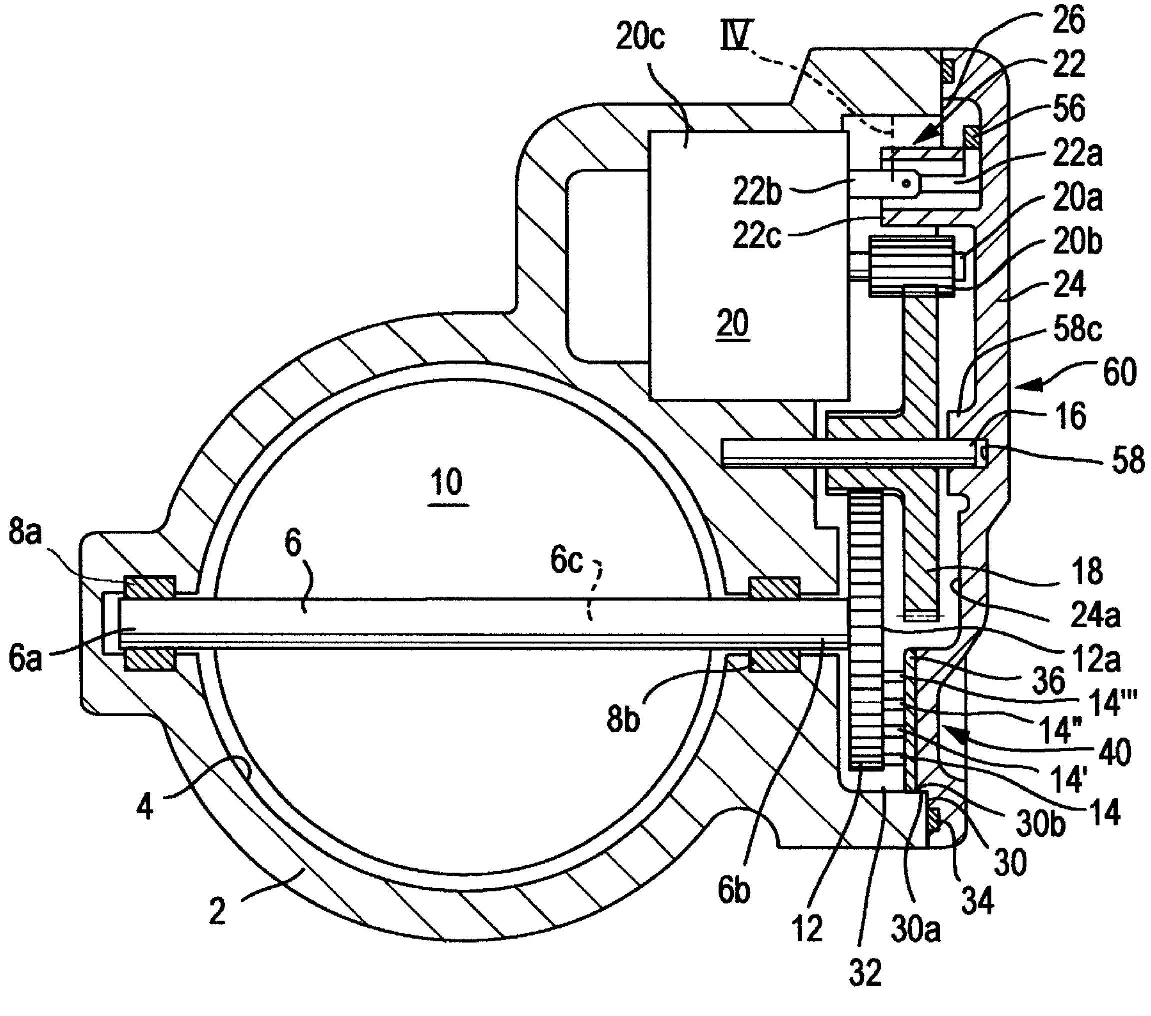
FIG. 1 (PRIOR ART)
FIG. 1 shows a cross-section through a prior art throttle valve.

FIG. 1 shows a prior art throttle valve housing 2. A gas conduit 4 extends through the throttle valve housing 2. By way of example, the gas conduit 4 leads from an air filter, not shown, to a combustion chamber, not shown, or to a plurality of combustion chambers of an internal combustion engine, not shown. The section shown in FIG. 1 extends crosswise through the gas conduit 4. Air or a fuel-air mixture can flow through the gas conduit 4.

A throttle valve shaft 6 extends crosswise through the gas conduit 4. The throttle valve shaft 6 has a left-hand end 6*a* and a right-hand end 6*b*. The throttle valve shaft 6 is pivotally supported in the throttle valve housing 2 with the aid of two bearings 8*a* and 8*b* on either side of the gas conduit 4. The imaginary center axis of the throttle valve shaft 6, about which the throttle valve shaft 6 rotates, will hereinafter be called the pivot axis 6*c* and is represented by a dot-dashed line in prior art FIG. 1.

A throttle valve 10 is secured by fastening screws or other fastening hardware, not shown, to the throttle valve shaft 6. The throttle valve shaft 6 can be pivoted 90°, for instance, between two terminal positions. In one of the two terminal positions, the throttle valve 10 almost completely closes the gas conduit 4. In the other terminal position of the pivoting range of the throttle valve shaft 6, the gas conduit 4 is maximally opened.

Outside the gas conduit 4, a gear wheel 12 is joined to the throttle valve shaft 6 in a manner fixed against rotation at the end 6*b* of the throttle valve shaft 6. The gear wheel 12 has a face end 12*a* remote from the gas conduit 4.

A shaft 16 is fixedly mounted to the throttle valve housing 2. A further gear wheel 18 is rotatably supported on the shaft 14. A throttle assembly lid or cover 24 is provided on one face end of the throttle valve housing 2. The lid 24 is secured to the throttle valve housing 2 with fasteners, not shown. A connection chamber 32 is formed between the throttle valve housing 2 and the lid 24. A control motor 20 is housed within the connection chamber 32.

The lid 24 rests on a bearing surface 26 on the throttle valve housing 2. The bearing surface 26 extends over the entire circumference of the lid 24. A lid guide 30*b* is also provided on the lid 24, and a housing guide 30*a* is provided on the throttle valve housing 2. The lid guide 30*b* and the housing guide 30*a*, in combination with one another, form a sensor guide 30 to assure proper alignment of the lid 24 and housing 2. A seal 34 seals the connection chamber 32 off from the outside and is provided around the connection chamber 32, between the lid 24 and the throttle valve housing 2. Located in the connection chamber 32 are essentially the control motor 20, a drive wheel 20*b*, the two gear wheels 12 and 18, a potentiometer sensor 40, and an electrical motor coupling 22. The connection chamber 32 may, depending on the version, be subdivided into plurality of individual chambers. The primary lengthwise direction of the lid 24 extends substantially crosswise to the pivot axis 6*c* of the throttle valve shaft 6 and crosswise to the pivot axis of both the drive shaft 20*a* and the gear wheel 18.

The control motor 20 has a housing 20*c* that is firmly anchored in the throttle valve housing 2. The control motor 20 has a drive shaft 20*a*, which protrudes parallel to the pivot axis 6*c* from the housing 20*c* on the face end and on which a drive wheel 20*b*, as a further gear wheel, is seated. The gear wheels 12, 18 and 20*b* are toothed wheels, for example, and arc in mutual engagement for the sake of translating torque from the control motor 20 to the throttle valve 10.

Parallel to the pivot axis of the drive shaft 20*a* and parallel to the pivot axis 6*c* of the throttle valve shaft 6, a motor counterpart plug contact 22*b* protrudes on the face end for the housing 20*c* of the control motor 20. The motor counterpart plug contact 22*b* is part of an electrical motor coupling 22. The motor counterpart plug contact 22*b* on the control motor 20 serves to supply electrical power to the control motor 20. The motor plug contact 22*b* of the motor coupling 22 is secured to the lid 24 on the inner side 24*a* toward the connection chamber 32. The lid 24 preferably comprises a nonconductive plastic but may be made of other nonconductive materials. The material of the lid 24 is pulled forward in the direction of the control motor 20, in the region of the motor plug contact 22*b*, and there forms a contact support 22*c*. The contact support 22*c* fits at least partway around the motor plug contact 22*b*.

Figure 2:
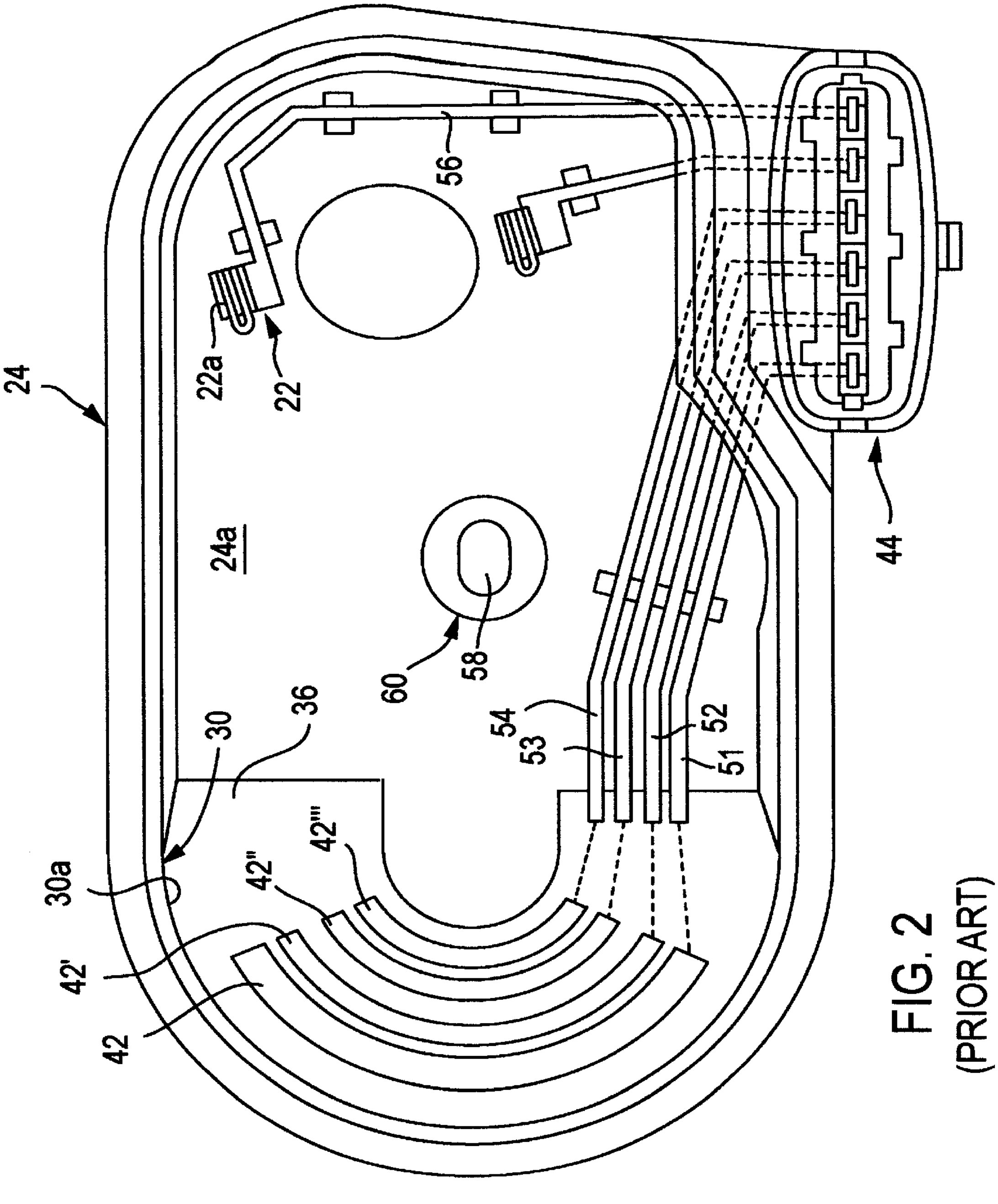
FIG. 2 (PRIOR ART)
FIG. 2 shows an inner side of FIG. 1.

A sheet-metal stamped part or electrical trace 56 connects the motor plug contact 22*b* to a coupling part 44, shown FIG. 2, for connection to external wiring. As FIGS. 1 and 2 show, the electrical trace 56, in the region where the motor counterpart plug contact 22*b* leading to the control motor 20 is located, is bent at and angle 90° and extends in the direction of the motor counterpart plug contact 22*b*. There, the electrical trace 56 ends in the form of the motor plug contact 22*a*. If the lid 24 is secured to the throttle valve housing 2, then the control motor 20 has electrical contact via the motor counterpart plug contact 22*b*, the motor plug contact 22*b* located on the end of the electrical trace 56, and the electrical trace 56 to the coupling part 44.

An oblong indentation 58 is provided on the inner side 24*a* of the lid 24. The shaft 16 protrudes past the gear wheel 18 on both ends. On one end, the shaft 16 is retained in the throttle valve housing 2, and on the other side of the gear wheel 18 the shaft 16 protrudes with slight radial play into the indentation 58. This creates an assembly aid 60 that facilitates the mounting of the lid 24 on the throttle valve housing 2.

The sensor 40 of the prior art device of FIG. 1 is a 20 potentiometer sensor which includes a wiper 14 fixedly mounted to the face end 12*a* of gear 12. Three further wipers 14', 14", 14'" are secured to the face end 12*a* beside the wiper 14. The lid 24 has an inner side 24*a* toward the chamber 32. A carrier material 36 for a potentiometer 40 is applied to the inner side 24*a*, facing the wipers 14, 14', 14", 14'". For example the carrier material 36 is glued to the inner side 24*a*. The wipers 14, 14', 14" and 14'", sweep along a plurality of potentiometer paths 42, 42', 42" and 42'", formed on the carrier material 36, as the throttle valve shaft 6 rotates, thereby determining the rotational position of the throttle valve 10.

Turning to FIGS. 3–7, the preferred embodiments of the invention are shown. In these embodiments, a non-contacting throttle valve position sensor 70, 170 for the throttle control valve 10 (which retains the throttle valve shaft 6 in the throttle housing 2, control motor 20 and geared transmission 12, 18, 20*b*) is substituted for the potentiometer sensor 40, which is illustrated in FIGS. 1 and 2.

Figure 3:
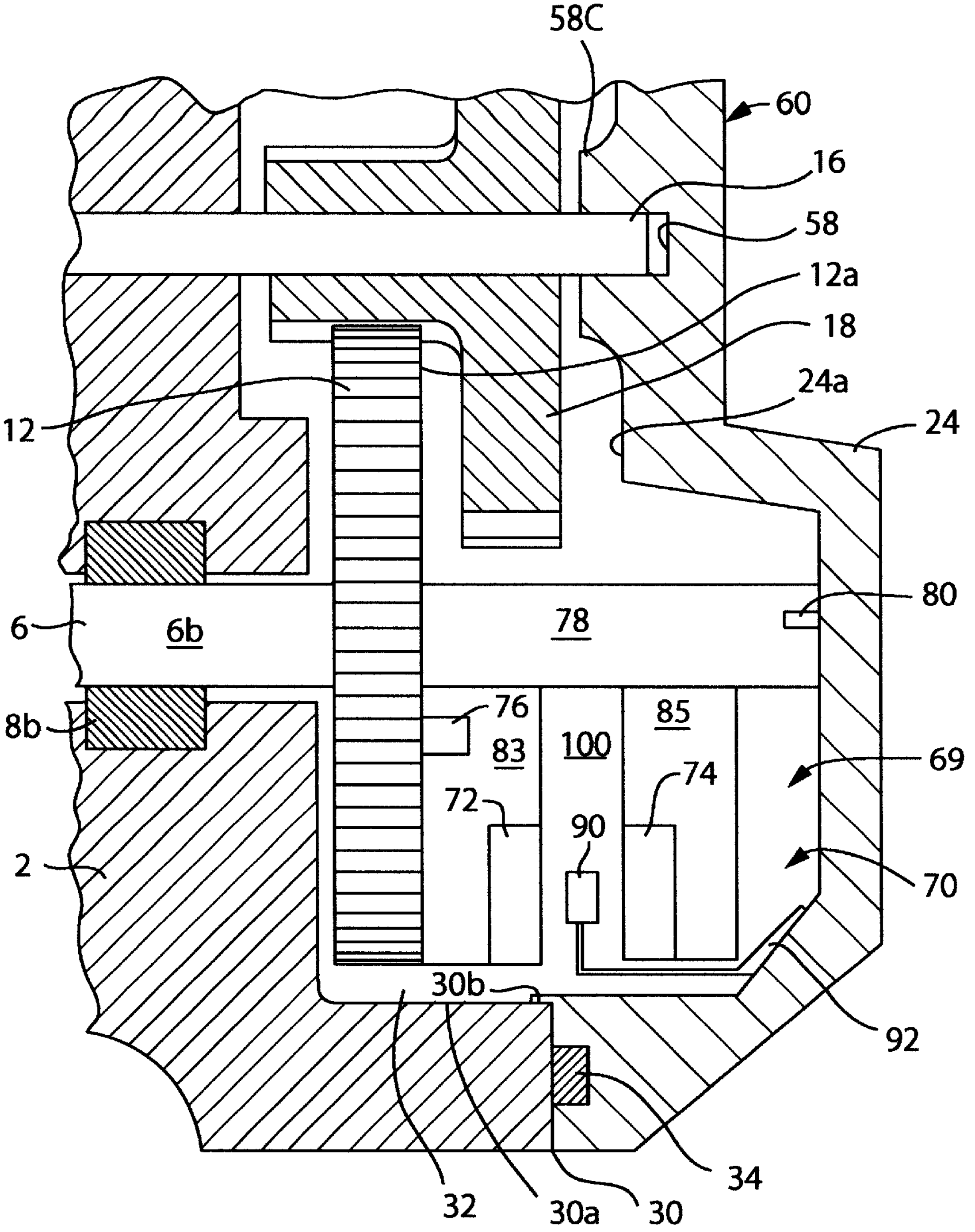
FIG. 3 shows a cross-section through a throttle valve in accordance with a first embodiment of the present invention.

Non-contacting throttle valve position sensors 70, 170 are preferably Hall effect type magnetic field sensors like those shown in U.S. Pat. Nos. 5,798,639, 5,757,179 and 5,712,561. In FIG. 3, sensor 70 is shown to include magnet structure 69 including first and second magnetized portions 72, 74, which are attached to arms 83, 85, or sensor shaft 78, and air gap 100. Sensors 70, 170 also include Hall effect sensors 90, the function of which will be described below.

Referring specifically to FIG. 3, sensor shaft or extension portion 78 extends away from gear 12 to space magnetized portion 72 from magnetized portion 74 and may be magnetically permeable for flux routing. First and second magnetized portions 72, 74 extend in parallel to each other and gear wheel 12, and are spaced apart from one another as they extend from extension 78 to create air gap 100. Extension portion 78 may also be rotatably supported at an end thereof by lid 24, which acts as the throttle valve cover. A pilot 80 may be provided on lid 24 to support extension portion 78 and throttle valve shaft 6.

Figure 4:
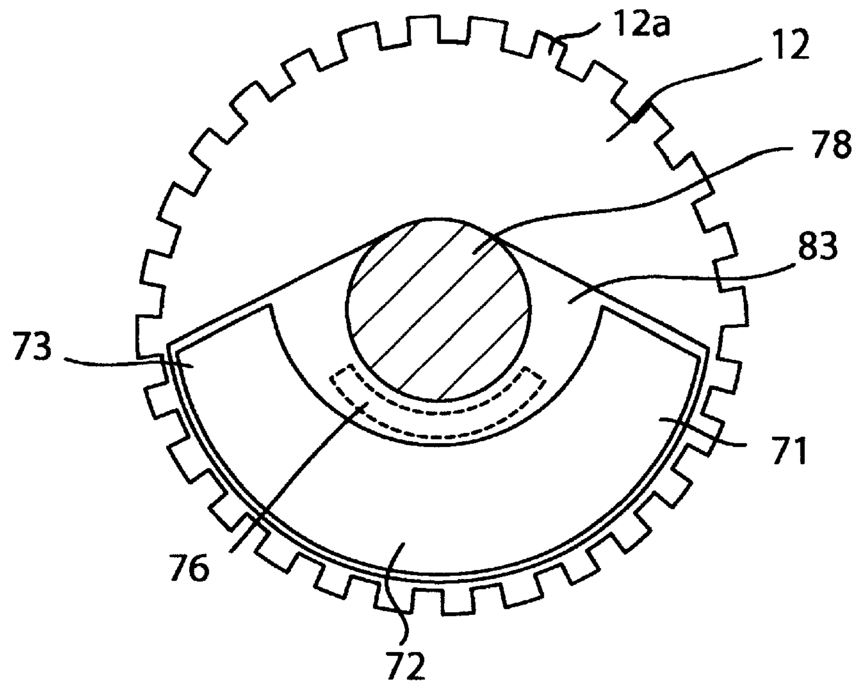
FIG. 4 shows a partial cross-section view of the first embodiment along the throttle shaft.
Figure 5:
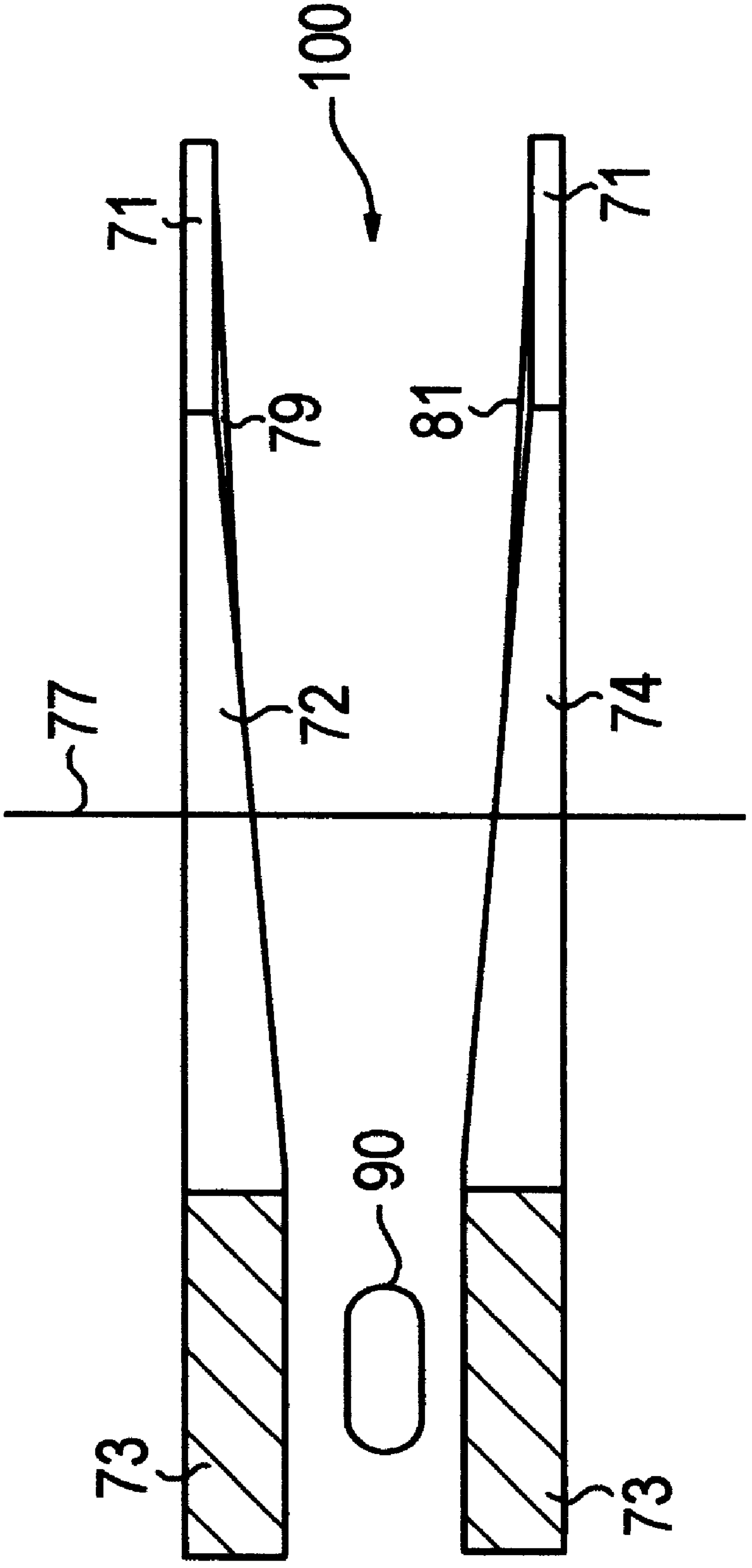
FIG. 5 shows a detail of magnets in the present invention.

FIGS. 4 and 5 show detailed views of the first embodiment. FIG. 4 shows a cross-section view of FIG. 3 illustrating arm 83 mounted on gear 12. FIG. 5 shows the interrelation of magnetized portions 72, 74 and Hall effect sensor 90. As shown in FIG. 4, gear 12 includes gear teeth 12*a* that may extend all the way around for meshing with gear wheel 18. The arm 83 and, hence, sensor shaft 78 and arm 85 are locked in position with gear 12 by a lock 76 and are movable with gear wheel 12. It is important to recognize that other mounting mechanisms, other than lock 76, are possible. For instance, first magnetized portion 72 may be glued or welded to gear wheel 12.

As best shown in FIG. 5, magnetized portions 72, 74 have thicker or larger ends 73 and narrower or smaller ends 71 with a gradually changing thickness therebetween. As a result, the magnetized portions 72, 74 include facing surfaces 79, 81 that widen away from each other as the magnetized portions 72, 74 thin out. By way of the thinning thicknesses, a magnetic field that varies along the lengths of the magnetized portions 72, 74 is created. The magnetic field has a larger/stronger signal between thicker sections 73 and a smaller/weaker signal between the narrower ends 71. The magnetized portions 72, 74 are also arcuate about axis 77, as shown in FIGS. 4 and 5. It is important to note that while two magnetized portions 72, 74 are preferred, one magnetic portion may be employed without departing from the scope of this invention. In that cage, the varying magnetic field would be created by one varying thickness magnetized portion and an opposing magnetically permeable plate, like steel. It is important to note that while a particular structure of magnetized portion has been disclosed, other structures are also possible, for example, as disclosed in related application to Duesler et al. entitled "Non-contacting Position Sensor Using Bipolar Tapered Magnets," filed Dec. 9, 1998, having attorney docket number CTS-1835 or CTS-9599 and application Ser. No. 09/208,296, now U.S. Pat. No. 6,211,668 B1.

Magnetized portions 72, 74 are preferably formed by molding magnetic materials such as bonded ferrite. Bonded ferrite offers both a substantial cost advantage and also a significant advantage over other similar magnetic materials in structural loss due to corrosion and other environmental degradation.

Referring to FIG. 3, Hall effect sensor 90 is placed near, and preferably between, first and second magnetized portions 72, 74 to sense the flux density that changes with rotational position and determines the position of gear wheel 12 and, hence, throttle valve shaft 6. Sensor 90 may have its circuitry 92 provided on lid 24 such that the above-described advantages of having an easily installed and manufactured, compact and accurate sensor mechanism are maintained. Circuitry 92 preferably couples to electrical traces 51–54 (FIG. 2), as necessary, for communication with an electric control unit via coupling part 44, as described above. It is important to note, however, that the circuitry 92 of non-contacting sensor 70 may be provided in other positions as well. For instance, it is contemplated that circuitry 92 could be compartmentalized with the other components of sensor 70 for insertion as a separate structure between gear wheel 12 and lid 24. Circuitry 92 could also be mounted on throttle valve housing 2 within connection chamber 32.

Figure 7:
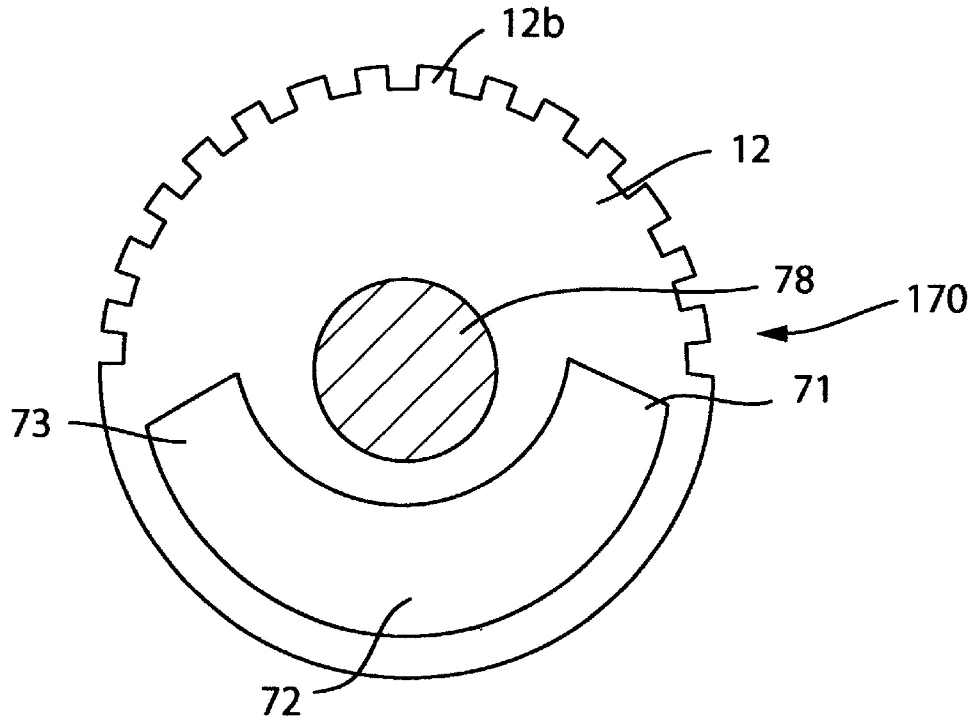
FIG. 7 shows a partial cross-section view of the second embodiment along the throttle shaft.
Figure 6:
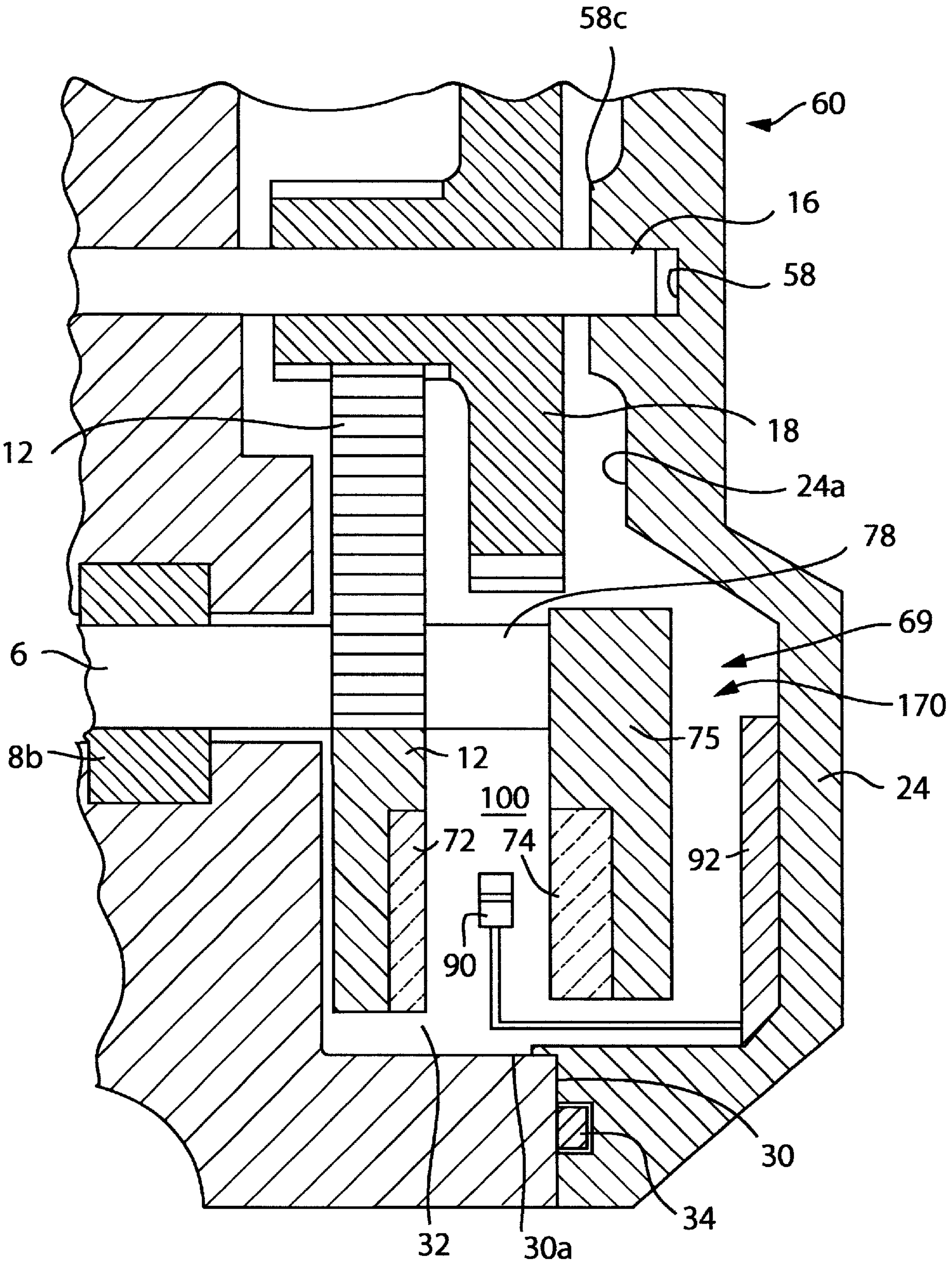
FIG. 6 shows a cross-section through a throttle valve in accordance with a second embodiment of the present invention.

FIGS. 6 and 7 show the sensor 170 in greater detail. FIG. 6 shows an alternative for extension portion 78 in which the extension may be an integral part of end 6*b* of throttle valve shaft 6. Magnet structure 69 is coupled to and integral with gear 12. Uniquely, first magnetized portion 72 is molded as part of or integral with gear 12. This feature may be provided in a variety of fashions and not depart from the scope of this invention. For instance, gear wheel 12 can have a pocket formed therein in which first magnetized portion 72 is mounted. Also, halt of gear wheel 12 Could be formed as first magnetized portion 72 including possibly exterior gear teeth 12*b*. Finally, if only a part of gear wheel 12 is utilized, a bottom portion of gear wheel 12 can be replaced by first magnetized portion 72. In any regard, it is also preferable, although not necessary, to provide second magnetized portion 74 integrally mounted within an arm 75, extending from extension portion 78, spaced from and parallel to first magnetized portion 72. Another alternative, illustrated in FIG. 7, is that gear 12 includes gear teeth 12*b* only around a portion thereof that is necessary for meshing with gear wheel 18. This reduces the amount of machining.

Sensor 90 is placed near, and preferably between, first and second magnetized portions 72, 74 in the air gap 100 to sense the rotational position of magnetized portions 72, 74 and to determine the position of gear wheel 12 and, hence, throttle valve shaft 6.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

For instance, the extension portion or sensor shaft 78 may be most any shape or size. Further, the magnet structure 69 of the invention need not be coupled to gear wheel 12 as operation of the invention can be achieved by coupling non-contacting sensor 70 to any movable portion of the geared transmission, e.g., the sensor in accordance with the invention could be coupled to gears 18 or 20*b*. The sensor 70 could also be mounted to the top of lid 24, have a separate enclosure, with sensor shaft 78 being coupled to one of the rotating gear shafts that would extend up into the separate sensor enclosure.

It is noted that sensor 70 is mounted within chamber 32 and is covered by throttle valve cover or lid 24. Additionally, sensor 70 and motor coupling 22 are in the same chamber 32, along with gears 12, 18 and 20*b*, and motor 20. Although connector 44 is positioned away form sensor 70, it is contemplated to move the connector close to sensor 70.

What is claimed is:

1. A throttle assembly having a throttle valve position sensor for use with a throttle control valve having a throttle valve shaft rotatably supported in a throttle housing and positionable by a control motor through a geared transmission, the throttle assembly comprising:

a) a gear, fixed to the throttle valve shaft;

b) a first tapered magnet mounted to the gear and extending perpendicularly to the shaft;

c) a second tapered magnet extending parallel to and spaced from the gear and the first magnet and coupled to the shaft; and d) a flux density sensor, located between the first and second tapered magnets, for sensing a flux density indicative of a rorational position of the first and second tapered magnets in response to the throttle valve shaft rotation, the first and second tapered magnets adapted to create a variable magnetic field, the magnitude of the variable magnetic field being proportional to the rotational position of the gear.

2. The throttle assembly of claim 1, wherein the flux density sensor is a Hall effect sensor and is positioned between the first and second tapered magnets.

3. The throttle assembly of claim 1, wherein the flux density sensor is a Hall effect sensor and is positioned near the first tapered magnet.

4. The throttle assembly of claim 1, wherein the first tapered magnet is coupled directly to a face of the gear.

5. The throttle assembly of claim 4, wherein the first tapered magnet is coupled to the gear by a locking system.

6. The throttle assembly of claim 4, further including a throttle assembly cover and an extension portion that is rotatably supported at one end by the throttle assembly cover and at another end by the gear.

7. The throttle assembly of claim 6, wherein the throttle assembly cover includes a pilot receivable in an end of the extension portion to pilot rotation of the extension portion.

8. The throttle assembly of claim 4, further comprising a second magnet extending parallel to and spaced from the first tapered magnet.

9. The throttle assembly of claim 8, wherein the flux density sensor is a Hall effect sensor and is positioned between the first and second tapered magnets.

10. The throttle assembly of claim 1, further including a throttle assembly cover and an extension portion that is rotatably supported at one end thereof by the throttle assembly cover and at another end by the gear.

11. The throttle assembly of claim 1, wherein at least part of the flux density sensor is positioned on a throttle assembly cover.

12. The throttle assembly of claim 1, wherein the first tapered magnet is molded into the gear wheel.

13. A throttle valve position sensor for use with a throttle control valve assembly having a throttle valve shaft rotatably supported in a throttle housing and positionable by a control motor through a geared transmission, the throttle valve position sensor comprising:

a) a system for creating a variable magnetic field, including a first tapered magnet mounted to a gear of the geared transmission, and extending perpendiculary to the shaft, and a second tapered magnet, extending parallel to and spaced from the gear and the first magnet, and coupled to the shaft, wherein the variable magnetic field system is movable with the gear; and b) a magnetic field sensor, located between the first and second tapered magnets, for sensing changes in the variable magnetic field that is indicative of the rotational position of the gear, and a flux density sensor, located between the first and second tapered magnets, for sensing a flux density indicative of a rotational position of the first and second tapered magnets in response to the throttle valve shaft rotation, the first and second tapered magnets adapted to create a variable magnetic field, the magnitude of the variable magnetic field being proportional to the rotational position of the gear.

14. The throttle valve position sensor of claim 13, wherein the system for creating a variable magnetic field is coupled to the gear by a lock.

15. The throttle valve position sensor of claim 13, wherein at least part of the magnetic field sensor is positioned on a cover of the throttle valve position sensor.

16. The throttle valve position sensor of claim 13, wherein the magnetic field sensor is a Hall effect sensor and is positioned near the system for creating a variable magnetic field.

17. The throttle valve position sensor of claim 13, further including an extension portion that is rotatably supported at an end thereof by a throttle control valve cover.

18. The throttle valve position sensor of claim 17, wherein the throttle control valve cover includes a pilot receivable in an end of the extension portion to pilot rotation of the extension portion.

19. A throttle control device comprising:

a) a throttle valve secured to a throttle valve shaft that is rotatably supported in a throttle valve housing;

b) a control motor including a drive gear operatively coupled to the throttle valve shaft for adjusting the rotational position thereof;

c) a magnetized portion coupled to the drive gear, wherein the magnetized portion further includes a first tapered magnet mounted to the gear and extending perpendicularly to the shaft, and a second tapered magnet extending parallel to and spaced from the gear and the first tapered magnet, and coupled to the shaft;

d) a flux density sensor, located between the first and second tapered magnets, for detecting the rorational position of the magnetized portion, the flux density indicative of a rotational position of the first and second tapered in response to the throttle valve shaft rotation, the first and second tapered magnets adapted to create a variable magnetic field, the magnitude of the variable magnetic field being proportional to the rotational position of the gear, the sensor including circuitry;

e) a lid coupled to the throttle valve housing, the circuitry being mounted on the lid; and f) a coupling part formed onto the lid and including electrical connections to the control motor circuitry.

* * * * *